United States Patent
Furuta (10) Patent No.: US 11,254,180 B2
(45) Date of Patent: Feb. 22, 2022

(54) VEHICLE TRAVEL CONTROL SYSTEM

(71) Applicant: TOYOTA JIDOSHA KABUSHIKI KAISHA, Toyota (JP)

(72) Inventor: Hiroki Furuta, Toki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 410 days.

(21) Appl. No.: 16/247,795

(22) Filed: Jan. 15, 2019

(65) Prior Publication Data
US 2019/0283520 A1 Sep. 19, 2019

(30) Foreign Application Priority Data
Mar. 13, 2018 (JP) .............................. JP2018-045491

(51) Int. Cl.
*B60G 17/018* (2006.01)
*B60G 17/019* (2006.01)

(52) U.S. Cl.
CPC ..... *B60G 17/018* (2013.01); *B60G 17/01908* (2013.01); *B60G 17/01933* (2013.01); *B60G 2400/10* (2013.01); *B60G 2400/20* (2013.01)

(58) Field of Classification Search
CPC ............ B60G 17/018; B60G 17/01908; B60G 17/01933; B60G 17/06; B60G 2400/10; B60G 2400/20; B60G 2500/10
See application file for complete search history.

(56) References Cited

U.S. PATENT DOCUMENTS

| | | | | |
|---|---|---|---|---|
| 5,425,436 A * | 6/1995 | Teramura | ............. | B60G 17/018 188/266.1 |
| 5,555,500 A * | 9/1996 | Ogawa | ................. | B60G 17/015 374/117 |
| 8,060,277 B2 * | 11/2011 | Poilbout | ............. | B60G 17/018 701/37 |
| 8,793,035 B2 * | 7/2014 | Yu | ....................... | B60W 40/076 701/1 |
| 9,454,508 B2 * | 9/2016 | Yu | ........................ | B60W 40/13 |

(Continued)

FOREIGN PATENT DOCUMENTS

| JP | 07186665 A | * | 7/1995 |
|---|---|---|---|
| JP | H07-186665 A | | 7/1995 |

(Continued)

*Primary Examiner* — Hunter B Lonsberry
*Assistant Examiner* — Daniel L Greene
(74) *Attorney, Agent, or Firm* — Sughrue Mion, PLLC (57) ABSTRACT

A vehicle travel control system includes: a sensor for detecting an acceleration or an angular velocity of a sprung mass structure of the vehicle; and a controller configured to: calculate a first sprung parameter being a velocity or a displacement of the sprung mass structure from the sensor detection value; apply a high pass filter to the first sprung parameter to acquire a second sprung parameter; and control travel of the vehicle based on the second sprung parameter. The controller changes strength of the high pass filter according to an offset level representing a magnitude of an offset component of the first sprung parameter. Regarding a first offset level and a second offset level higher than the first offset level, the high pass filter is stronger in a case of the second offset level than in a case of the first offset level.

1 Claim, 11 Drawing Sheets

(56) References Cited

U.S. PATENT DOCUMENTS

| | | | | |
|---|---|---|---|---|
| 2002/0035423 A1* | 3/2002 | Shank | ................ | B60G 17/0185 701/37 |
| 2007/0067080 A1* | 3/2007 | Messih | ................... | B60T 8/172 701/37 |
| 2008/0300752 A1* | 12/2008 | Poilbout | .............. | B60G 17/018 701/37 |
| 2009/0043452 A1* | 2/2009 | Sekiya | ............... | B60G 17/0165 701/40 |
| 2009/0062984 A1* | 3/2009 | Poilbout | .............. | B60G 17/018 701/37 |
| 2009/0164064 A1* | 6/2009 | Yamanaka | ........... | B60G 17/018 701/37 |

FOREIGN PATENT DOCUMENTS

| | | | |
|---|---|---|---|
| JP | 11078467 A | * | 3/1999 |
| JP | H11-78467 A | | 3/1999 |
| JP | 2016-002778 A | | 1/2016 |

* cited by examiner

VEHICLE TRAVEL CONTROL SYSTEM

BACKGROUND

Technical Field

The present disclosure relates to a vehicle travel control system that controls travel of a vehicle. In particular, the present disclosure relates to a vehicle travel control system that executes vehicle travel control based on a velocity or a displacement of a sprung mass structure of a vehicle.

Background Art

Patent Literature 1 discloses a suspension system for a vehicle. The suspension system has a shock absorber whose damping force is variable. The suspension system controls the damping force of the shock absorber in order to effectively suppress oscillation of a sprung mass structure of a vehicle.

According to Patent Literature 1, the control of the damping force is executed based on a sprung velocity and a stroke speed. The sprung velocity is a vertical velocity of the sprung mass structure at a wheel position. The stroke speed is a relative speed between the sprung mass structure and an unsprung mass structure. The suspension system has a sprung acceleration sensor that detects a vertical acceleration of the sprung mass structure at each wheel position. The suspension system calculates (estimates) the sprung velocity and the stroke speed based on the vertical acceleration detected by the sprung acceleration sensor. For example, the sprung velocity is calculated by integrating the detected vertical acceleration.

LIST OF RELATED ART

Patent Literature 1: Japanese Unexamined Patent Application Publication No. JP-2016-002778

SUMMARY

According to the technique disclosed in Patent Literature 1 described above, the sprung velocity necessary for the damping force control for the oscillation suppression is calculated based on the vertical acceleration of the sprung mass structure. The vertical acceleration of the sprung mass structure is detected by the sprung acceleration sensor. However, there is a possibility that the vertical acceleration being a sensor detection value includes an offset component (error component) due to influence of pitching and rolling caused by road surface gradient, acceleration/deceleration, steering, and so forth. Accordingly, there is a possibility that the sprung velocity calculated based on the sensor detection value also includes an offset component caused by the road surface gradient, acceleration/deceleration, steering, and so forth. When the sprung velocity includes the offset component, the damping force control does not work as expected and thus an effect of the oscillation suppression is reduced. That is to say, the offset component of the sprung velocity deteriorates performance (effect) of the damping force control executed based on the sprung velocity.

Control executed based on the sprung velocity is not limited to the control of the damping force of the shock absorber of the suspension. More generally, it is considered to control travel of the vehicle based on the sprung velocity. The offset component of the sprung velocity deteriorates performance of the vehicle travel control executed based on the sprung velocity.

Moreover, it is also possible to execute the vehicle travel control based on a sprung displacement (a displacement of the sprung mass structure) instead of the sprung velocity. When the sprung displacement is calculated based on an acceleration or an angular velocity detected by a sensor, the sprung displacement may include an offset component. The offset component of the sprung displacement deteriorates performance of the vehicle travel control executed based on the sprung displacement.

An object of the present disclosure is to provide a technique that can improve performance of vehicle travel control executed based on a velocity or a displacement of a sprung mass structure of a vehicle.

A first disclosure is directed to a vehicle travel control system installed on a vehicle.

The vehicle travel control system includes:
a sensor configured to detect an acceleration or an angular velocity of a sprung mass structure of the vehicle; and
a control device.

The control device is configured to execute:
sprung parameter calculation processing that calculates a first sprung parameter being a velocity or a displacement of the sprung mass structure from a detection value detected by the sensor;
filtering processing that applies a high pass filter to the first sprung parameter to acquire a second sprung parameter; and
vehicle travel control processing that controls travel of the vehicle based on the second sprung parameter.

In the filtering processing, the control device changes strength of the high pass filter according to an offset level representing a magnitude of an offset component of the first sprung parameter.

Regarding a first offset level and a second offset level higher than the first offset level, the high pass filter is stronger in a case of the second offset level than in a case of the first offset level.

A second disclosure further has the following feature in addition to the first disclosure.

In the filtering processing, the control device acquires a third sprung parameter by applying a low pass filter to the first sprung parameter and calculates the offset level according to a time during which a sign of the third sprung parameter remains a same.

The offset level is higher as the time is longer.

A third disclosure further has the following feature in addition to the first disclosure.

In the filtering processing, the control device calculates the offset level according to a time during which a sign of the first sprung parameter remains a same.

The offset level is higher as the time is longer.

The vehicle travel control system according to the present disclosure applies the high pass filter to the first sprung parameter calculated by the sensor detection value to acquire the second sprung parameter. Then, the vehicle travel control system executes the vehicle travel control based not on the first sprung parameter but on the second sprung parameter.

The strength of the high pass filter is not constant but changed flexibly according to the offset level of the first sprung parameter. When the offset level is relatively high, a relatively strong high pass filter is used. As a result, the offset component is effectively eliminated and thus the performance of the vehicle travel control is improved.

On the other hand, when the offset level is relatively low, the offset component has less impact on the vehicle travel control. Rather, influence of phase shift due to the application of the high pass filter on the vehicle travel control is more important. Therefore, when the offset level is relatively low, a relatively weak high pass filter is used. As a result, the phase shift is suppressed and thus the performance of the vehicle travel control is improved.

EMBODIMENTS

Embodiments of the present disclosure will be described below with reference to the attached drawings.

1. Outline

Figure 1:
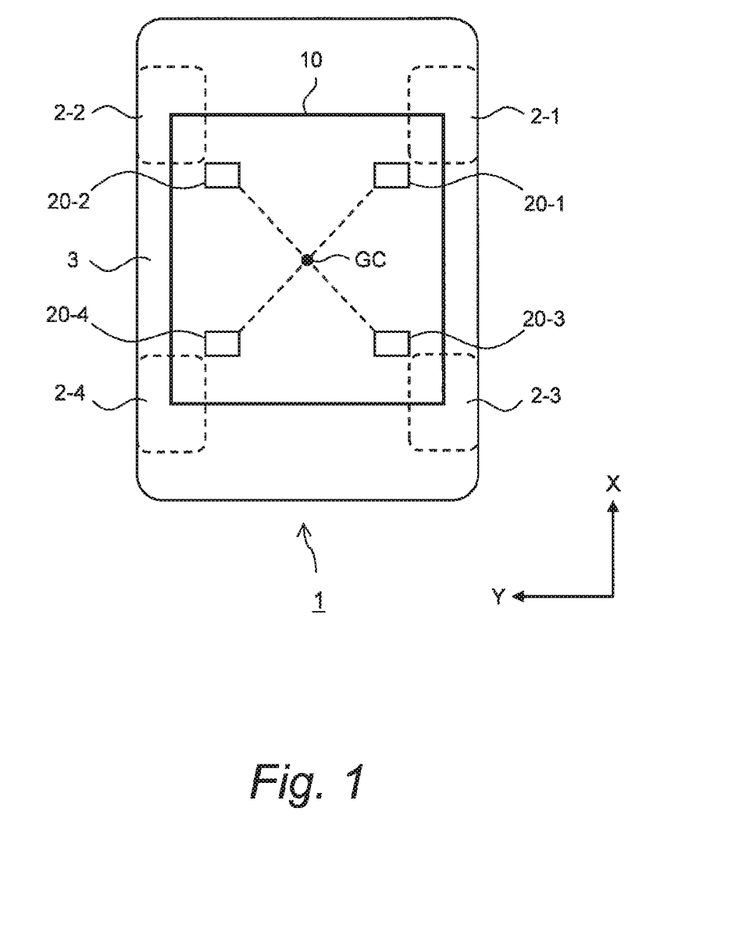
FIG. 1 is a conceptual diagram for explaining an outline of an embodiment of the present disclosure.

FIG. 1 is a conceptual diagram for explaining an outline of an embodiment of the present disclosure. The vehicle 1 is provided with wheels 2 and a sprung mass structure 3. The wheels 2 include a right front wheel 2-1, a left front wheel 2-2, a right rear wheel 2-3, and a left rear wheel 2-4.

A vehicle travel control system 10 is installed on the vehicle 1 and executes vehicle travel control that controls travel of the vehicle 1. In particular, the vehicle travel control system 10 executes the vehicle travel control based on a sprung velocity. The sprung velocity is a velocity of the sprung mass structure 3 and includes at least one of a vertical velocity, a roll velocity, and a pitch velocity.

The sprung velocity is calculated based on a vertical acceleration of the sprung mass structure 3. The vertical acceleration of the sprung mass structure 3 is detected by a sprung acceleration sensor 20. In the example shown in FIG. 1, four sprung acceleration sensors 20-1 to 20-4 are respectively provided at four positions of the sprung mass structure 3.

A first sprung acceleration sensor 20-1 detects the vertical acceleration of the sprung mass structure 3 at a first position located on a side of the right front wheel 2-1 as seen from a sprung gravity center position GC. Here, the sprung gravity center position GC is a position of the center of gravity of the sprung mass structure 3. A second sprung acceleration sensor 20-2 detects the vertical acceleration of the sprung mass structure 3 at a second position located on a side of the left front wheel 2-2 as seen from the sprung gravity center position GC. A third sprung acceleration sensor 20-3 detects the vertical acceleration of the sprung mass structure 3 at a third position located on a side of the right rear wheel 2-3 as seen from the sprung gravity center position GC. A fourth sprung acceleration sensor 20-4 detects the vertical acceleration of the sprung mass structure 3 at a fourth position located on a side of the left rear wheel 2-4 as seen from the sprung gravity center position GC. It should be noted that distances from the sprung gravity center position GC to the first to fourth positions are arbitrary.

A detection value of the vertical acceleration detected by the i-th sprung acceleration sensor $20$-$i$ (i=1 to 4) is hereinafter referred to as a detected acceleration $Z_i''$. The vehicle travel control system 10 calculates the sprung velocity based on the detected acceleration $Z_i''$. For example, the vehicle travel control system 10 calculates the sprung velocity by integrating the detected acceleration $Z_i''$. The sprung velocity calculated based on the detected acceleration $Z_i''$ is hereinafter referred to as a first sprung velocity $Z1'$.

However, there is a possibility that the detected acceleration $Z_i''$ includes an offset component (error component) due to influence of pitching and rolling caused by road surface gradient, acceleration/deceleration, steering, and so forth. Accordingly, there is a possibility that the first sprung velocity $Z1'$ calculated based on the detected acceleration $Z_i''$ also includes an offset component caused by the road surface gradient, acceleration/deceleration, steering, and so forth.

Figure 2:
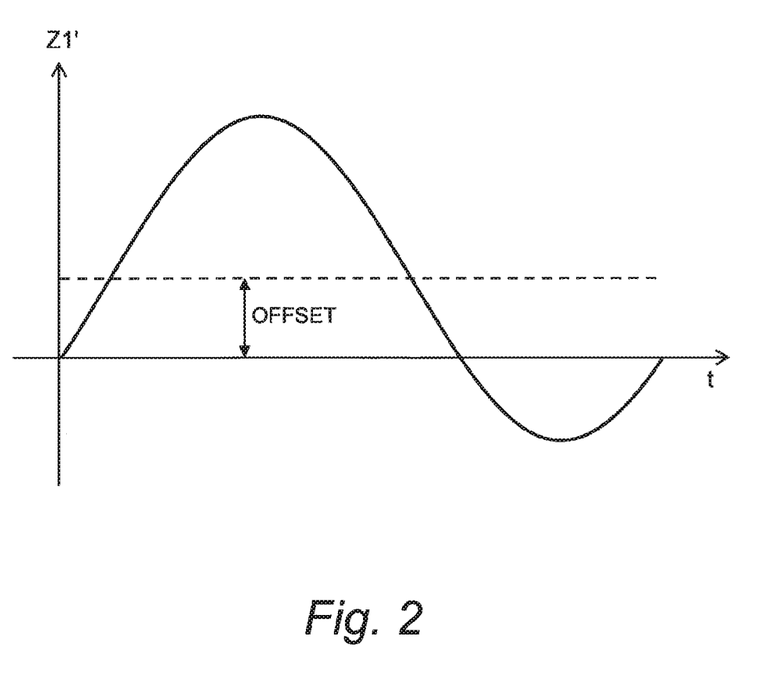
FIG. 2 is a timing chart conceptually showing a first sprung velocity in the embodiment of the present disclosure.

FIG. 2 conceptually shows the first sprung velocity $Z1'$. The first sprung velocity $Z1'$ includes an oscillating component and an offset component. In general, a resonance frequency of the sprung mass structure 3, that is, a frequency of the oscillating component is about 1 to 3 Hz. While on the other hand, a frequency of the offset component caused by the road surface gradient, acceleration/deceleration, steering, and the like is 0.5 Hz or less.

When the first sprung velocity $Z1'$ including the offset component is directly used for the vehicle travel control, the vehicle travel control does not work as expected and thus an effect of the vehicle travel control is reduced. In view of the above, according to the present embodiment, a high pass filter is applied to the first sprung velocity $Z1'$ in order to eliminate the offset component. A sprung velocity acquired by applying the high pass filter to the first sprung velocity $Z1'$ is hereinafter referred to as a second sprung velocity $Z2'$.

Figure 3:
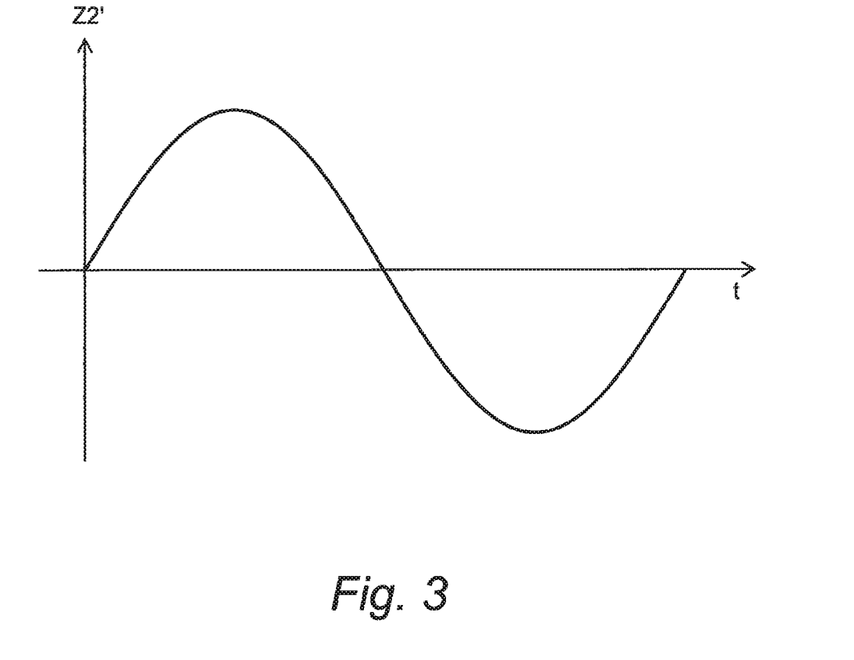
FIG. 3 is a timing chart conceptually showing a second sprung velocity in the embodiment of the present disclosure.

FIG. 3 conceptually shows the second sprung velocity $Z2'$. The offset component is suppressed in the second sprung velocity $Z2'$, as compared with the first sprung velocity $Z1'$. Using the second sprung velocity $Z2'$ instead of the first sprung velocity $Z1'$ for the vehicle travel control can reduce influence of the offset component.

However, due to the application of the high pass filter, a phase of the second sprung velocity $Z2'$ leads that of the first sprung velocity $Z1'$. Therefore, in a situation where the offset component does not occur, the performance of the vehicle travel control may be conversely deteriorated due to the phase shift. In view of the above, according to the present embodiment, strength of the high pass filter is flexibly changed according to a magnitude of the offset component of the first sprung velocity $Z1'$.

Here, "the high pass filter is stronger" means that "its filtering effect is higher". For example, as a cutoff frequency fc becomes higher, the filtering effect of the high pass filter becomes higher, that is, the high pass filter becomes stronger. It is thus possible to change the strength of the high pass filter by adjusting the cutoff frequency fc. As another example, it is also possible to change the strength of the high pass filter by adjusting an order of the high pass filter or a number of application times of the high pass filter. It should be noted that in the present embodiment, a case where the cutoff frequency fc=0 also is included in the concept of the high pass filter.

A parameter representing the magnitude (width) of the offset component of the first sprung velocity $Z1'$ is hereinafter referred to as an offset level OL. The offset level OL becomes higher as the offset component of the first sprung velocity $Z1'$ becomes larger. Conversely, the offset level OL becomes lower as the offset component of the first sprung velocity $Z1'$ becomes smaller. In a situation where the offset component does not occur, the offset level OL is zero.

Figure 4:
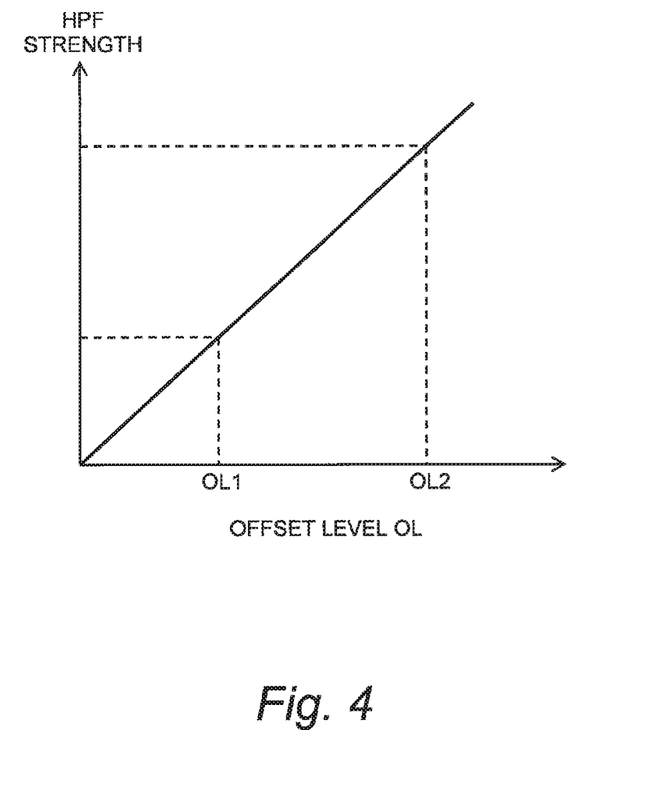
FIG. 4 is a conceptual diagram showing an example of a correspondence relationship between an offset level and strength of a high pass filter in the embodiment of the present disclosure.

FIG. 4 shows an example of a correspondence relationship between the offset level OL and the strength of the high pass filter. In the example shown in FIG. 4, the high pass filter becomes stronger as the offset level OL becomes higher. Conversely, the high pass filter becomes weaker as the offset level OL becomes lower. When the offset level OL is zero, the cutoff frequency fc of the high pass filter is set to 0 so as not to cause the phase shift.

Figure 5:
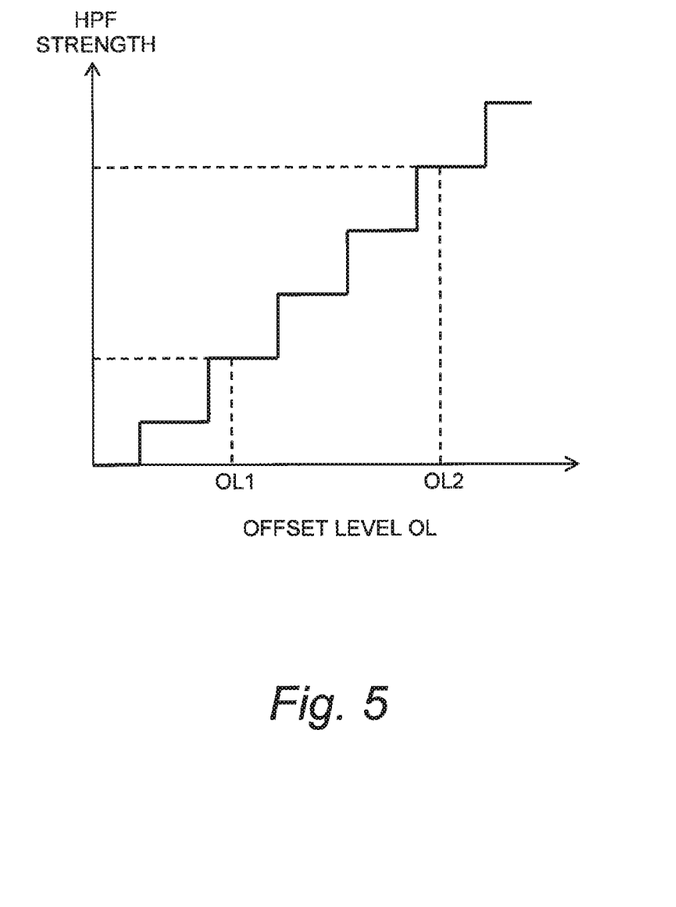
FIG. 5 is a conceptual diagram showing another example of a correspondence relationship between an offset level and strength of a high pass filter in the embodiment of the present disclosure.

FIG. 5 shows another example of a correspondence relationship between the offset level OL and the strength of the high pass filter. The strength of the high pass filter does not necessarily have to be proportional to the offset level OL. As shown in FIG. 5, the high pass filter may become stronger in a stepwise fashion according to increase in the offset level OL.

In each case of FIGS. 4 and 5, the high pass filter is relatively weak when the offset level OL is relatively low, and the high pass filter is relatively strong when the offset level OL is relatively high. A generalization of the above is as follows. Let us consider a first offset level OL1 and a second offset level OL2 higher than the first offset level OL1 as the offset levels OL. The high pass filter is so set as to be stronger in the case of the second offset level OL2 than in the case of the first offset level OL1.

As described above, the vehicle travel control system 10 according to the present embodiment applies the high pass filter to the first sprung velocity $Z1'$ to acquire the second sprung velocity $Z2'$. Then, the vehicle travel control system 10 executes the vehicle travel control based not on the first sprung velocity $Z1'$ but on the second sprung velocity $Z2'$.

The strength of the high pass filter is not constant but changed flexibly according to the offset level OL of the first sprung parameter $Z1'$. When the offset level OL is relatively high, a relatively strong high pass filter is used. As a result, the offset component is effectively eliminated and thus the performance of the vehicle travel control is improved.

On the other hand, when the offset level OL is relatively low, the offset component has less impact on the vehicle travel control. Rather, influence of the phase shift due to the application of the high pass filter on the vehicle travel control is more important. Therefore, when the offset level OL is relatively low, a relatively weak high pass filter is used. As a result, the phase shift is suppressed and thus the performance of the vehicle travel control is improved.

In this manner, according to the present embodiment, it is possible to appropriately execute the vehicle travel control by using an appropriate high pass filter depending on a situation.

Hereinafter, the vehicle travel control system 10 according to the present embodiment will be described in more detail.

2. Configuration Example of Vehicle Travel Control System

Figure 6:
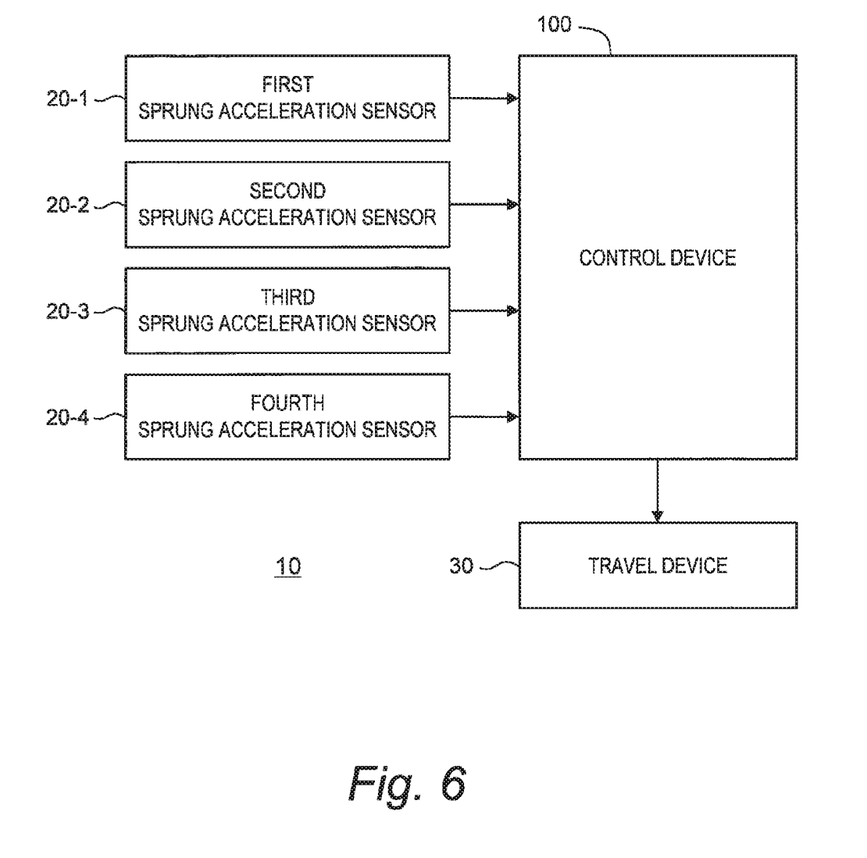
FIG. 6 is a block diagram showing a configuration example of a vehicle travel control system according to the embodiment of the present disclosure.

FIG. 6 is a block diagram showing a configuration example of the vehicle travel control system 10 according to the present embodiment. The vehicle travel control system 10 includes the i-th sprung acceleration sensor 20-$i$ (i=1 to 4), a travel device 30, and a control device 100. The i-th sprung acceleration sensor 20-$i$ sends information of the detected acceleration $Z_i''$ to the control device 100.

The travel device 30 is a device relating to the travel of the vehicle 1. The travel device 30 includes a suspension, an active stabilizer, a driving device, a braking device, a steering device, a transmission, and so forth.

The control device 100 (a controller) is a microcomputer provided with a processor, a memory, and an input/output interface. The control device 100 is also called an ECU (Electronic Control Unit). A control program executable by the processor is stored in the memory. Functions of the control device 100 is achieved by the processor executing the control program. In particular, the control device 100 executes the vehicle travel control by controlling an operation of the travel device 30. Hereinafter, processing by the control device 100 will be described.

3. Processing Flow by Control Device

Figure 7:
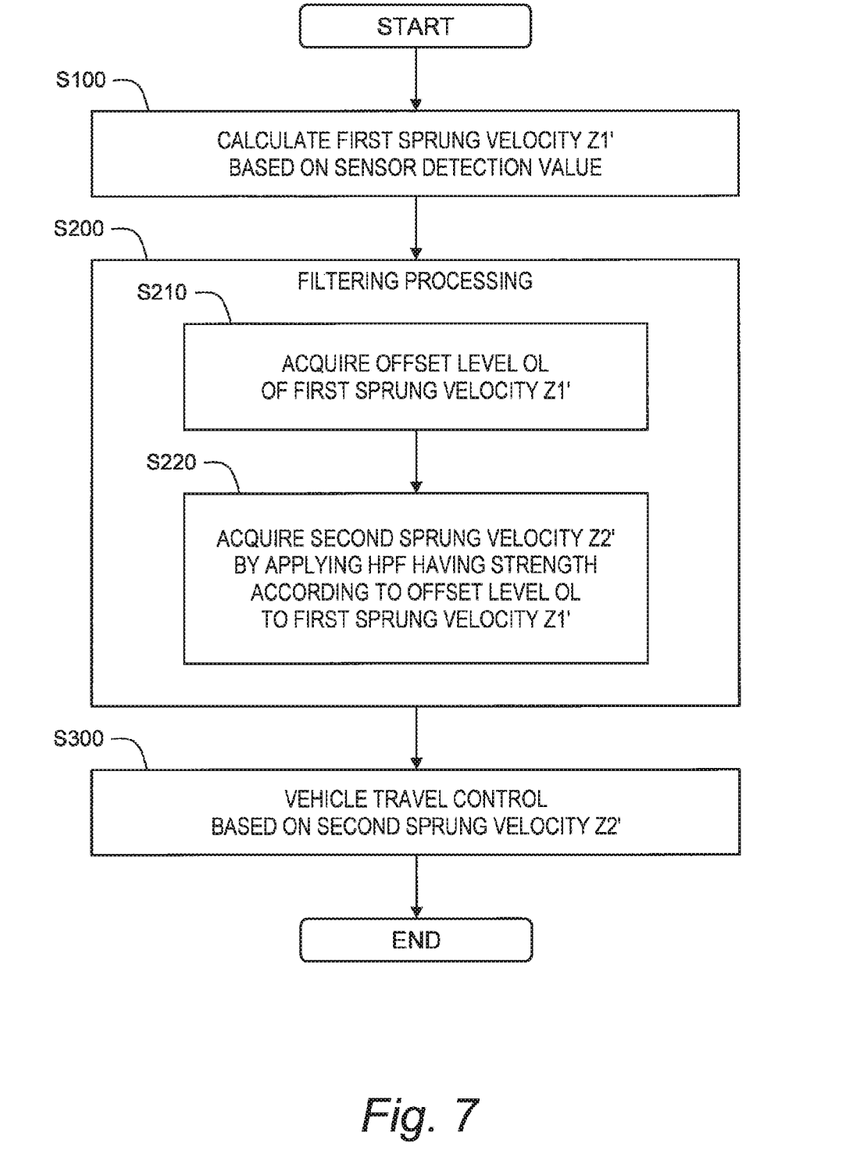
FIG. 7 is a flow chart showing processing by a control device of the vehicle travel control system according to the embodiment of the present disclosure.

FIG. 7 is a flow chart showing processing by the control device 100 of the vehicle travel control system 10 according to the present embodiment. The processing flow shown in FIG. 7 is repeatedly executed every certain cycle.

3-1. Step S100 (Sprung Velocity Calculation Processing)

The control device 100 receives the information of the detected acceleration $Z_i''$ from the i-th sprung acceleration sensor 20-$i$ (i=1 to 4). Then, the control device 100 calculates the first sprung velocity $Z1'$ based on the detected acceleration $Z_i''$.

For example, the control device 100 integrates the detected acceleration $Z_i''$ to calculate the sprung velocity $Z_i'$ at the sensor position as the first sprung velocity $Z1'$. Alternatively, the control device 100 can calculate each mode velocity (i.e. a vertical velocity $Z_g'$, a roll velocity $\Phi_g'$, and a pitch velocity $\Theta_g'$) at the sprung gravity center position GC as the first sprung velocity $Z1'$ by a method described below.

Figure 8:
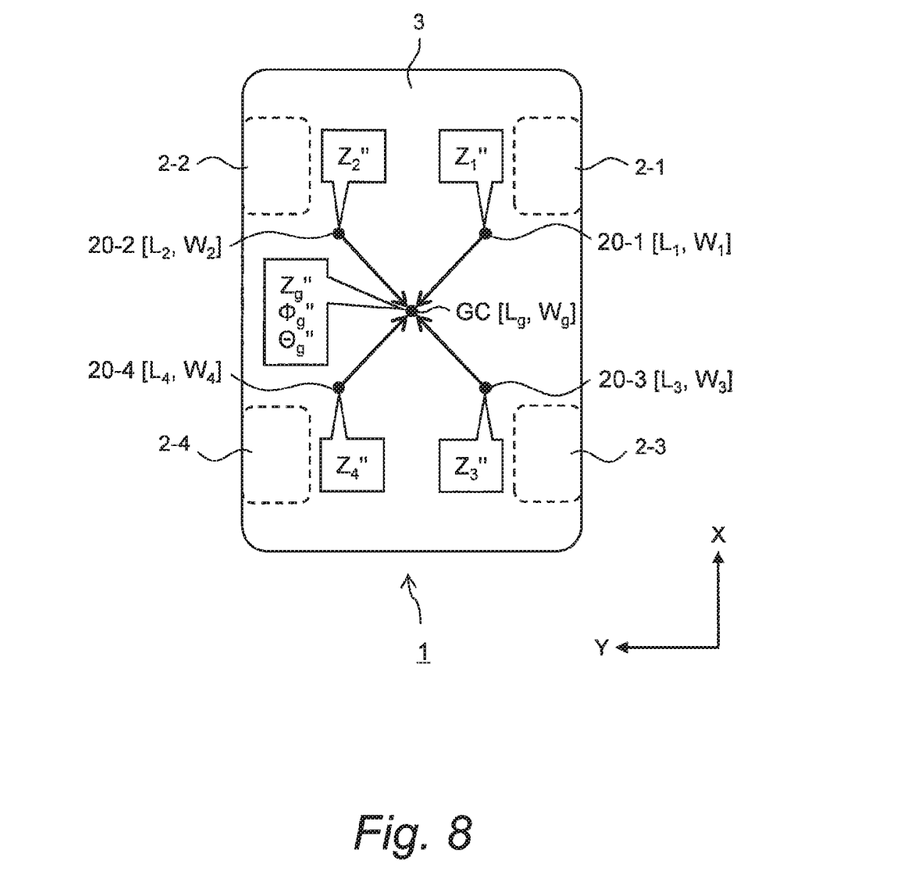
FIG. 8 is a conceptual diagram for explaining Step S100 in FIG. 7.

FIG. 8 is a conceptual diagram for explaining calculation of each mode velocity at the sprung gravity center position GC. An X-direction is a travel direction of the vehicle 1. A Y-direction is a lateral direction of the vehicle 1 and is orthogonal to the X-direction. A Z-direction represents an upward direction of the vehicle 1. An X-direction position and a Y-direction position of the i-th sprung acceleration sensor 20-$i$ are $L_i$ and $W_i$, respectively. An X-direction position and a Y-direction position of the sprung gravity center position GC are $L_g$ and $W_g$, respectively. These parameters ($L_i$, $W_i$, $L_g$, and $W_g$) are beforehand acquired and stored in the memory of the control device 100.

First, the control device 100 calculates each mode acceleration (i.e. a vertical acceleration $Z_g''$, a roll acceleration $\Phi_g''$, and a pitch acceleration $\Theta_g''$) of the sprung gravity center position GC from the detected acceleration $Z_i''$. For example, the control device 100 calculates the vertical acceleration $Z_g''$, the roll acceleration $\Phi_g''$, and the pitch acceleration $\Theta_g''$ in accordance with the following Equations (1) to (4).

[Equation 1]

$$M = \begin{bmatrix} L_1 W_1 & L_1 & W_1 & 1 \\ L_2 W_2 & L_2 & W_2 & 1 \\ L_3 W_3 & L_3 & W_3 & 1 \\ L_4 W_4 & L_4 & W_4 & 1 \end{bmatrix}^{-1} \quad (1)$$

[Equation 2]

$$Z_g'' = \sum_{i=1}^{4} \{M(2,i)L_g + M(4,i)\}Z_i'' \quad (2)$$

[Equation 3]

$$\Phi_g'' = -\sum_{i=1}^{4} \{M(1,i)L_g + M(3,i)\}Z_i'' \quad (3)$$

[Equation 4]

$$\Theta_g'' = \sum_{i=1}^{4} M(2,i)Z_i'' \quad (4)$$

It is possible to calculate the vertical acceleration $Z_g''$, the roll acceleration $\Phi_g''$, and the pitch acceleration $\Theta_g''$ of the sprung gravity center position GC with high accuracy by using the detected accelerations $Z_1''$ to $Z_4''$ at four positions. However, the calculation method is not limited to that. For example, only three sprung acceleration sensors 20 may be used.

Subsequently, the control device 100 integrates the each mode acceleration to calculate the each mode velocity (the vertical velocity $Z_g'$, the roll velocity $\Phi_g'$, and the pitch velocity $\Theta_g'$) of the sprung gravity center position GC. The vertical velocity $Z_g'$, the roll velocity $\Phi_g'$, and the pitch velocity $\Theta_g'$ of the sprung gravity center position GC are expressed by the following Equations (5) to (7), respectively.

[Equation 5]

$$Z_g' = \int Z_g'' \quad (5)$$

[Equation 6]

$$\Phi_g' = \int \Phi_g'' \quad (6)$$

[Equation 7]

$$\Theta_g' = \int \Theta_g'' \quad (7)$$

3-2. Step S200 (Filtering Processing)

Next, the control device 100 acquires the second sprung velocity Z2' by applying the high pass filter to the first sprung velocity Z1' calculated in Step S100. Here, the control device 100 flexibly changes the strength of the high pass filter according to the offset level OL of the first sprung velocity Z1' (see FIGS. 4 and 5). To that end, the control device 100 first acquires the offset level OL of the first sprung velocity Z1'.

3-2-1. Step S210 (Acquisition of Offset Level OL)

First Example

Figure 9:
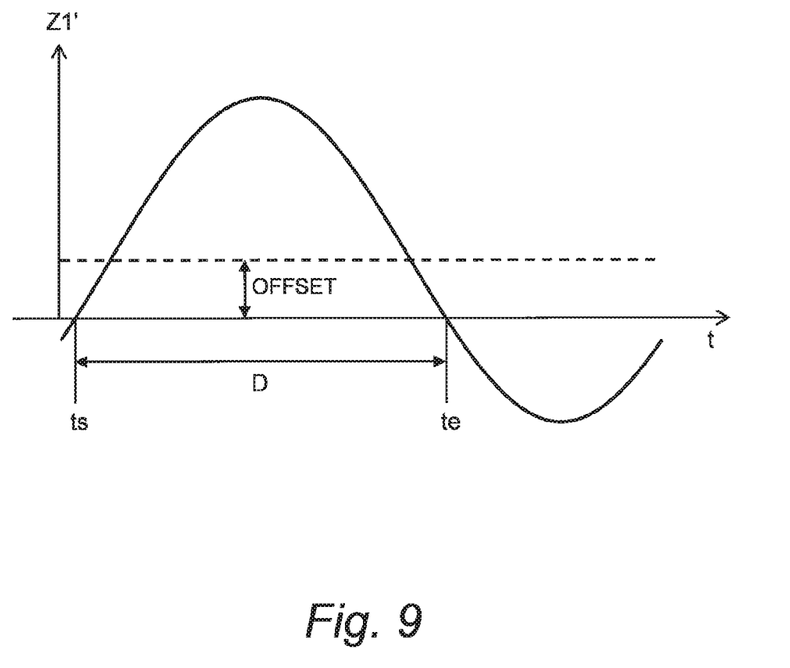
FIG. 9 is a timing chart for explaining Step S210 in FIG. 7.

FIG. 9 conceptually shows the first sprung velocity Z1'. A time during which a sign of first sprung velocity Z1' remains the same is hereinafter referred to as a "duration D". In the example shown in FIG. 9, the sign of the first sprung velocity Z1' remains positive for a period from a time ts to a time te. The period from the time ts to the time te corresponds to the duration D.

The duration D in a case where the first sprung velocity Z1' has no offset component is "D0". When the offset component occurs, the duration D becomes longer than D0. Furthermore, the duration D becomes longer as the offset component becomes larger. That is, the duration D reflects the magnitude of the offset component of the first sprung velocity Z1'. Therefore, the control device 100 can calculate the offset level OL according to the duration D. The offset level OL is higher as the duration D is longer after the duration D exceeds D0.

For example, the control device 100 uses a counter to measure the duration D. More specifically, the control device 100 stores the calculated first sprung velocity Z1' and compares the signs of a previous value and a latest value of the first sprung velocity Z1'. When the sign of the latest value is the same as that of the previous value, the control device 100 increments the counter. When the sign of the latest value changes from that of the previous value, the control device 100 resets the counter.

It should be noted that when resetting the counter, the control device 100 may gradually decrease the count value and the offset level OL in order to suppress abrupt changes in the count value and the offset level OL when the sign is changed. In other words, a rate limiter may be used for countdown. As another example, upper limits of the count value and the offset level OL may be set in consideration of a case where the sign remains the same without change for a long time.

Second Example

In a second example, the control device 100 first applies a low pass filter to the first sprung velocity Z1'. The sprung velocity acquired by applying the low pass filter to the first sprung velocity Z1' is hereinafter referred to as a third sprung velocity Z3'. The control device 100 acquires a duration D during which a sign of the third sprung velocity Z3' remains the same, by the same method as in the case of the first example. Then, the control device 100 calculates the offset level OL according to the duration D. The offset level OL is higher as the duration D is longer.

Applying the low pass filter to the first sprung velocity Z1' can make the offset component included in the first sprung velocity Z1' more conspicuous. Therefore, using the third sprung velocity Z3' instead of the first sprung velocity Z1' can make it easier to detect the offset component. When it becomes easier to detect the offset component, the high pass filter used in the next Step S220 becomes stronger. As a result, the effect of the offset component elimination in the next Step S220 becomes more powerful.

Moreover, adjusting strength of the low pass filter makes it possible to adjust the effect (priority) of the offset component elimination in the next Step S220. In other words, adjusting the strength of the low pass filter makes it possible to adjust a balance between the offset component elimination and the phase shift suppression.

Third Example

The frequency of the oscillating component of the first sprung velocity Z1' is about 1 to 3 Hz. While on the other hand, the frequency of the offset component of the first sprung velocity Z1' is 0.5 Hz or less. In a third example, the control device 100 uses a band pass filter to extract both the oscillating component and the offset component. Then, the control device 100 calculates the offset level OL according to a ratio of the offset component to the oscillating component. In this case, the offset level OL is higher as the ratio of the offset component is higher.

3-2-2. Step S220 (Filtering)

The control device 100 sets the strength of the high pass filter according to the offset level OL acquired in Step S210. As shown in FIGS. 4 and 5, the high pass filter is relatively weak when the offset level OL is relatively low, and the high pass filter is relatively strong when the offset level OL is relatively high.

Various examples can be considered as a method of adjusting the strength of the high pass filter. For example, the control device 100 may adjust the cutoff frequency fc of the high pass filter. The high pass filter becomes stronger as the cutoff frequency fc becomes higher.

Figure 10:
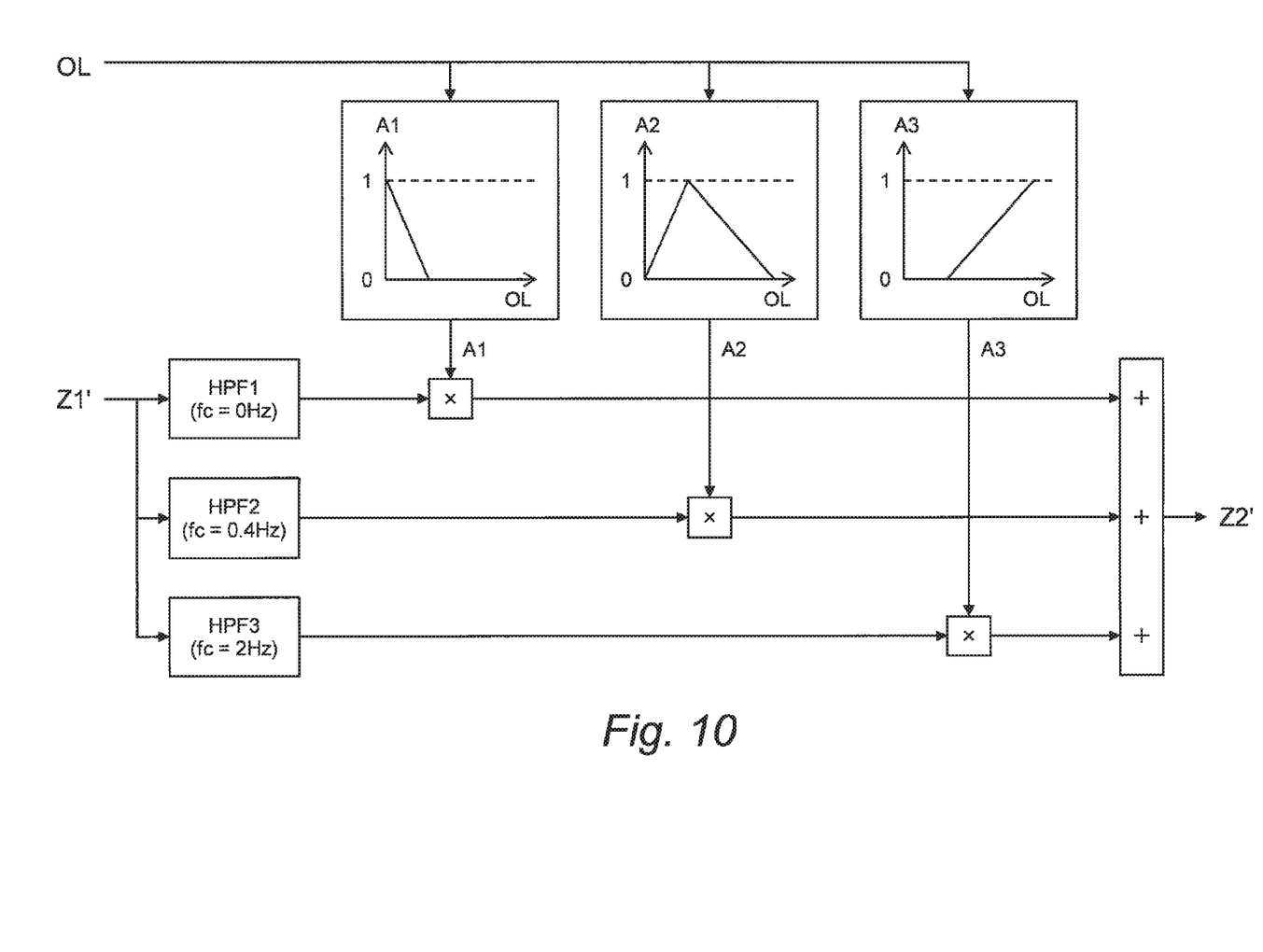
FIG. 10 is a conceptual diagram for explaining Step S220 in FIG. 7.
Figure 11:
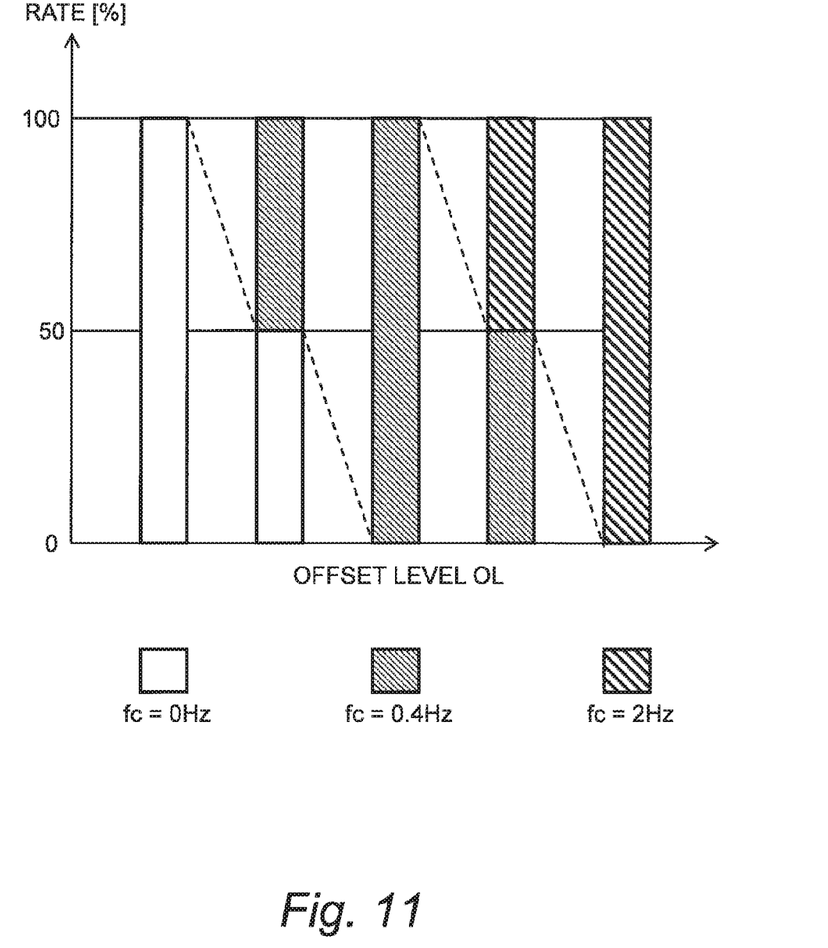
FIG. 11 is a conceptual diagram for explaining Step S220 in FIG. 7.

FIGS. 10 and 11 are conceptual diagrams for explaining another example of the method of adjusting the strength of the high pass filter. In this example, a plurality of high pass filters having different strengths are used. For example, the cutoff frequency fc of a first high pass filter HPF1 is 0 Hz. The cutoff frequency fc of a second high pass filter HPF2 is 0.4 Hz. The cutoff frequency fc of a third high pass filter HPF3 is 2 Hz.

In addition, weights A1, A2, and A3 are set for the first high pass filter HPF1, the second high pass filter HPF2, and the third high pass filter HPF3, respectively. The weights A1, A2, and A3 vary according to the offset level OL. In a state where the offset level OL is low, the weight A1 is the highest. As the offset level OL becomes higher, the weight A1 decreases and the weight A2 increases instead. As the offset level OL increases further, the weight A2 decreases and the weight A3 increases instead. That is, as the offset level OL becomes higher, the weight (rate) of the stronger high pass filter increases.

The first sprung velocity Z1' is input to the high pass filters HPF1 to HPF3 in parallel. A sum of products of respective outputs from the high pass filters HPF1 to HPF3 and respective weights A1 to A3 is output as the second sprung velocity Z2'.

In this manner, the control device 100 acquires the second sprung velocity Z2' by applying the high pass filter adjusted according to the offset level OL to the first sprung velocity Z1'. For example, the high pass filters are respectively applied to the vertical velocity $Z_g'$, the roll velocity $\Phi_g'$, and the pitch velocity $\Theta_g'$ calculated by the above Equations (5) to (7). As a result, a vertical velocity $Z_{g\_HPF'}$, a roll velocity $\Phi_{g\_HPF'}$, and a pitch velocity $\Theta_{g\_HPF'}$ are acquired as the second sprung velocities Z2'.

In addition, regarding the first sprung velocity Z1', a static offset component independent of the road surface gradient, acceleration/deceleration, and steering may be eliminated (i.e. 0-point correction). For example, an offset component caused by a sensor inclination at a static state may be eliminated.

3-3. Step S300 (Vehicle Travel Control Processing)

The control device 100 executes the vehicle travel control by controlling the operation of the travel device 30. Here, the control device 100 executes the vehicle travel control based not on the first sprung velocity Z1' but on the second sprung velocity Z2' acquired in Step S200. Since the vehicle travel control is executed based on the second sprung velocity Z2', the performance (effect) of the vehicle travel control is improved.

As an example of the vehicle travel control, let us consider a case of controlling a damping force of a suspension in order to suppress oscillation of the sprung mass structure 3. The suspension is provided for each wheel 2-i and connects between the sprung mass structure 3 and an unsprung mass structure (not shown). The suspension includes a shock absorber whose damping force is variable. Controlling the damping force of the shock absorber appropriately according to a travel state of vehicle 1 makes it possible to effectively suppress the oscillation of the sprung mass structure 3.

For instance, let us consider a case of suppressing each mode oscillation (i.e. vertical oscillation, roll oscillation, and pitch oscillation) of the sprung gravity center position GC. The control device 100 calculates a required control amount required for suppressing each mode oscillation. The required control amounts include a vertical required control amount $F_z$ for suppressing the vertical oscillation, a roll required control amount $M_r$ for suppressing the roll oscillation, and a pitch required control amount $M_p$ for suppressing the pitch oscillation. The control device 100 calculates these required control amounts from the second sprung velocities Z2' (i.e. the vertical velocity $Z_{g\_HPF'}$, the roll velocity $\Phi_{g\_HPF'}$, and the pitch velocity $\Theta_{g\_HPF'}$) acquired in Step S200. More specifically, the vertical required control amount $F_z$, the roll required control amount $M_r$, and the pitch required control amount $M_p$ are given by the following Equations (8) to (10), respectively.

[Equation 8]

$$F_z = G_z Z'_{g\_HPF} \tag{8}$$

[Equation 9]

$$M_r = G_r \Phi'_{g\_HPF} \tag{9}$$

[Equation 10]

$$M_p = G_p \Theta'_{g\_HPF} \tag{10}$$

In the Equations (8) to (10), $G_z$, $G_r$, and $G_p$ are control gains. For example, the control gains $G_z$, $G_r$, and $G_p$ are linear gains according to a skyhook damper control theory. The control device 100 can calculate each required control amount at the sprung gravity center position GC by multiplying each mode velocity of the sprung gravity center position GC by the control gain. Alternatively, the control device 100 may calculate each required control amount by referring to a map based on each mode velocity.

The control device 100 controls the damping force of the shock absorber in accordance with the required control amounts calculated. It is thus possible to suppress the oscillation of the sprung mass structure 3. In this manner, the control device 100 executes the damping force control based on the second sprung velocity Z2'. Since not the first sprung velocity Z1' but the second sprung velocity Z2' is used, the performance (effect) of the damping force control also is improved.

It should be noted that the vehicle travel control is not limited to the damping force control for the suspension. The vehicle travel control includes control of an active suspension, control of an active stabilizer, control of a driving device generating a driving force, and so forth. For example, when an in-wheel motor is provided for each wheel 2-i, it is possible to independently control the driving force of the wheel 2-i by controlling operations of the in-wheel motors. By appropriately controlling the driving force of the wheel 2-$i$, it is possible to generate such a moment that suppresses the oscillation of the sprung mass structure 3.

4. Control Based on Sprung Displacement

In the above embodiment, the vehicle travel control based on the sprung velocity is described. The method according to the present embodiment is similarly applicable to vehicle travel control based on a "sprung displacement" being a displacement of the sprung mass structure 3.

The sprung displacement is calculated by integrating an acceleration detected by an acceleration sensor. Alternatively, the sprung displacement is calculated by integrating an angular velocity detected by a rate gyro sensor. The sprung displacement calculated based on such the sensor detection value may also include an offset component caused by the road surface gradient, acceleration/deceleration, steering, and so forth. Therefore, the method according to the present embodiment is also effective for the sprung displacement. The method according to the present embodiment is capable of improving the performance of the vehicle travel control executed based on the sprung displacement.

A "sprung parameter" is the sprung velocity or the sprung displacement. The term "sprung velocity" in the above-described embodiment can be replaced by the term "sprung parameter". For example, the sprung parameter corresponding to the first sprung velocity $Z1'$ is a first sprung parameter. The sprung parameter corresponding to the second sprung velocity $Z2'$ is a second sprung parameter.

What is claimed is:

1. A vehicle travel control system installed on a vehicle and comprising:
   a sensor configured to detect an acceleration or an angular velocity of a sprung mass structure of the vehicle; and
   a controller configured to:
      calculate a first sprung parameter being a velocity or a displacement of the sprung mass structure from a detection value detected by the sensor; and
      apply a high pass filter to the first sprung parameter to acquire a second sprung parameter,
   wherein when applying the high pass filter, the controller is further configured to:
      acquire a third sprung parameter by applying a low pass filter to the first sprung parameter;
      calculate an offset level according to a time during which a sign of the third sprung parameter remains the same, wherein the offset level is higher as the time is longer; and
      change strength of the high pass filter according to the offset level representing a magnitude of an offset component of the first sprung parameter,
   wherein regarding a first offset level and a second offset level higher than the first offset level, the high pass filter is stronger in a case of the second offset level than in a case of the first offset level, and
   wherein the controller is further configured to control travel of the vehicle based on the second sprung parameter.

* * * * *